Patented Nov. 7, 1950

2,528,615

UNITED STATES PATENT OFFICE 2,528,615

SILOXANE RESINS

Earle J. Smith, Midland Township, Midland County, Mich., assignor to Dow Corning Corporation, Midland, Mich., a corporation of Michigan No Drawing. Application January 21, 1946,
Serial No. 642,441

2 Claims. (Cl. 260—46.5)

The present invention relates to siloxane resins, and particularly to organosiloxane resins in which the organo groups are methyl and phenyl radicals, of use as insulating enamels.

Enamels may be employed in various ways in the insulation of electrical conductors. Insulating fabrics may be impregnated with enamel. Enamels may be applied directly to formed electrical conductors which it is unnecessary to flex during use or during wiring operations. They may be applied to magnet wire, which is then made into magnet coils and thereafter cured. This method can be employed with enamels which, in cured state, fail to meet the high standards set for magnet wire enamels. There is a substantial demand for magnet wire enamel to be applied to the wire and cured, which enamels do not fail when subjected to mechanical stresses, such as flexing and stretching, during manufacturing operations. Organic resins suitable for this service are known in the art. These resins, as is customary with organic resins, are not serviceable in the high temperature range in which the resins of this invention are of utility.

For a magnet wire enamel to be satisfactory, it should cure to a non-tacky condition upon heating. There should be a range of at least 100° F., lying below 1000° F., throughout which range properly cured enamel is obtained at a constant curing time. This allows latitude in curing the resins, which is desirable, since exact control is not employed in commercial insulating procedures. The enamel should cure at a rate sufficiently high that it is cured in less than an hour at about 500° F.

The enamel should not fail when the wire is wrapped around a mandrel of its own diameter. The enamel should not crack or form a loose tube when the wire is broken by a quick jerk. The principal properties necessary to meet these tests are flexibility, extensibility, toughness, and strong bonding to metal surfaces. Magnet coils which are made of wire so insulated are frequently impregnated with resins to seal the coils. The impregnating resin is then cured by heating. The magnet wire enamel should have a sufficiently high softening point that the impregnating resin can be cured without softening of the magnet wire enamel.

Siloxane resins which cure upon heating have been described in the prior art. These resins are not satisfactory for service as magnet wire enamels.

Objects of the present invention are the provision of improved siloxane resins; the provision of siloxane resins which are tough, flexible, and extensible; and the provision of siloxane resins suitable for use as magnet wire enamel. Other objects and advantages of the present invention will be apparent from the following description and the subjoined claims.

In the siloxanes of the present invention, essentially all of the structural units are substantially as follows:

$$CH_3SiO_{1.5}$$

$$C_6H_5SiO_{1.5}$$

$$CH_3C_6H_5SiO$$

The methyl siloxane units are present in amount between 10 and 40 mol. per cent, the phenyl siloxane units between 9 and 25 mol. per cent, and the methyl phenyl siloxane units between 40 and 70 mol. per cent. It has been found that siloxane resins of this composition cure upon heating to flexible, tough, extensible enamels and are suitable for magnet wire coatings.

The silicon atoms of the various siloxane structural units are linked together by the oxygen atoms thereof, in an alternating lattice of oxygen and silicon atoms. While a major portion of the oxygen atoms of the units are linked to two silicon atoms, a portion of the oxygen atoms are active centers for further polymerization and are present as residual hydroxyl, alkoxy or like radicals. Also, when the siloxanes are prepared from silicon halides, they may contain traces of halogen. A small percentage of such materials is present in all siloxanes until polymerization is entirely complete. Other materials, such as metal or metal oxide pigments or fibres may be mixed with or impregnated with the siloxanes of this invention, though when employed as magnet wire enamel, such additives are normally not used.

It has been found that the compositions containing these structural units in the amounts indicated possess physical properties not possessed by compositions containing the same structural units differently proportioned. Resins which contain between 40 and 70 mol. per cent methyl phenyl siloxane units and in which the remainder is either methyl or phenyl siloxane units are unsatisfactory for a magnet wire enamel. These binary resins fail the test in which the wire is wrapped around a mandrel of its own diameter and the test in which the wire is broken by a quick jerk. No good explanation can be given of the fact that the resins of the present invention pass both of these tests whereas the resins of the two binary systems fail both. While in some respects methyl and phenyl siloxane units are equivalent, the two appear to act differently in the present polymer. In combination, in the proportions stated, they produce results not accomplished by either one separately. It is believed that during bodying of the resin predominantly methyl siloxane units polymerize. This polymerization appears to be controlled or modified by the presence of the other siloxane units. The phenyl siloxane units appear to cause setting of the resins during curing. This does not indicate that the phenyl siloxane units have not entered into the molecular structure of the polymer until curing, since it is entirely possible for the phenyl siloxane units to be portions of the copolymer molecules and also to be active centers for further polymerization, inasmuch as phenyl siloxane units can polymerize in three directions.

The resins of the present invention may be produced by hydrolyzing organosilicon compounds and copolymerizing the hydrolyzate by any appropriate specific method. The organosilicon compounds which are hydrolyzed should be substantialy free of hydrolyzable siliceous compounds other than derivatives of monomethyl silane, monophenyl silane and methyl phenyl silane. The remaining valences of the silicon in these derivatives may be satisfied by any of the well known readily hydrolyzable radicals or elements such as alkoxy, aroxy and amino radicals and halogens. These organosilicon derivatives may be obtained by any appropriate production method, such as by simultaneously coupling methyl and phenyl Grignard reagents with silicon in the form of tetrachlor silane or ethyl orthosilicate and refining the crude reaction mixture to obtain the three desired silane derivatives in commercially pure form in which they are substantially free of other hydrolyzable siliceous compounds including silicon tetrachloride or ethyl orthosilicate. Alternatively, the methyl and phenyl Grignard reagents may be separately reacted with silicon tetrachloride to obtain by purification monomethyl and monophenyl silicon chlorides. The methyl phenyl silicon chloride may be produced by coupling a portion of the methyl silicon trichloride with a phenyl radical by a phenyl Grignard reagent or by coupling a portion of the phenyl silicon trichloride with a methyl radical by a methyl Grignard reagent.

The hydrolysis may be readily effected by reacting the organosilicon derivatives with water. The temperature should be sufficiently low that, at the pressure employed, the methyl silane derivative does not evaporate rapidly. In any instance when the rate of hydrolysis is low, the rate may be increased by the addition of an acid catalyst. It is convenient to employ an organic solvent, such as toluene, in the reaction mixture to collect the hydrolysis products as formed. While from a commercial standpoint it is preferable to hydrolyze the silane derivatives in mixture, practical results are also obtainable by hydrolyzing some of the materials separately and blending the hydrolysis products to the desired composition prior to extensive polymerization thereof. When the silane derivatives which are hydrolyzed contain chlorsilanes, hydrogen chloride is a product of the hydrolysis. The hydrogen chloride may be either totally or partially retained in solution in the aqueous phase, depending upon the temperature, pressure, and amount of water present. When the silanes include alkoxy silanes, alcohol is a product of the hydrolysis and may likewise be retained in the aqueous phase. When using alkoxy silanes, it is desirable to add an alcohol to the hydrolysis medium to act as a solvent for the derivatives. The aqueous layer may be separated following hydrolysis or retained in the mixture until after polymerization.

During hydrolysis, the hydrolysis product generaly polymerizes to a limited extent. This partially polymerized material may be bodied by further partial condensation or polymerization, effected by heating the oil. With the higher percentages of methyl phenyl siloxane structural units, higher temperatures or longer times are generally necessary to effect the same amount of bodying than with the lower percentages. During the bodying, the solvent may be allowed to evaporate. Alternatively, solvent evaporation may be effected before bodying by warming under vacuum, whereby the solvent is evaporated prior to the temperature becoming sufficiently high that substantial bodying commences. Bodying is effected at a temperature generally below about 400° C. The extent of bodying may vary, though it is condensed at least sufficiently that a liquid or solid resin is produced and insufficiently that the resin is insoluble in benzene. It is frequently desirable to add a solvent to the solid or liquid resin which is thereby produced. In order to promote the polymerization, in some instances, a conventional acid or basic condensation catalyst, such as hydrochloric acid or sodium hydroxide, may be employed.

The enamels described may be applied to the wire and cured. It is frequently desirable to apply a plurality of coats of enamel to a wire to build up a layer of substantial thickness. In this case the wire is subjected to alternate coating and baking. After curing of the enamel by baking, the wire may then be fabricated into magnet coils.

*Example 1*

A resin was prepared which contained 30 mol. per cent of methyl siloxane structural units, 15 mol. per cent of phenyl siloxane structural units and 55 mol. per cent of methyl phenyl siloxane structural units, as follows.

A mixture was prepared of the following composition:

| | Lbs. | Mol. Per Cent |
|---|---|---|
| $CH_3SiCl_3$ | 34 | 30 |
| $C_6H_5SiCl_3$ | 23.25 | 15 |
| $C_6H_5CH_3SiCl_2$ | 78.7 | 55 |

One fifth of this mixture was introduced into 30 gallons of toluene and 10 gallons of water in a kettle provided with indirect heat exchange. The mixture was introduced at a rate sufficiently low, that with the cooling available, the kettle temperature remained below 30° C. After the portion of silicon chlorides was introduced, the aqueous phase was removed and replaced with an additional 10 gallons of water, following which another fifth of the mixture was introduced. The remaining three-fifths of the mixture were introduced in like manner, with removal of the aqueous phase following each introduction. The solution of resin in toluene was washed with water until the effluent wash water was neutral to brom-cresol purple. The aqueous phase was separated by decantation. The toluene was removed by distillation to 120° C. at which point the remaining material contained 80 to 90 per cent solids. Residual water remaining after decantation was removed as a toluene-water azeotrope during distillation of the toluene. The temperature was then raised to the range of 130 to 180° C. and held under vacuum at this temperature until a 50 per cent by weight solution of the resin in toluene had a viscosity of 30 to 40 centistokes. Ten per cent of toluene was then added, based on total weight of the resin, following which heating was continued until a 50 per cent by weight solution of the resin in toluene had a viscosity of 125 centistokes. The resin was then immediately cooled and diluted to 50 per cent solids with toluene. This solution had a viscosity of between 1 and 2 poises.

The resin of this example is thermosetting. When used as a panel coating in a film of 3 mils thickness, it cured in less than 1 hour at 250° C. and was still flexible after being held at 250° C. for 30 hours.

This resin was employed to insulate magnet wire by alternately dipping the wire in the resin solution and curing the film, for six dips. The curing oven varied in temperature from 500° F. at the wire inlet to 820° F. at the outlet. The oven was 12 feet long. A curing time of about one-half minute was obtained by moving the wire at a rate of 20 to 25 feet per minute. The wire produced passes both of the stated tests.

A resin was prepared by the same method as that of this example. It contained 55 mol. per cent of methyl phenyl siloxane structural units and 45 mol. per cent of phenyl siloxane structural. After curing this resin lost its flexibility when held at 250° C. for 1 hour. Magnet wire insulated with this enamel failed both of the described tests.

Example 2

A series of resins was prepared of the compositions indicated employing in each case the stated amounts of reagents.

|  | No. 1 | No. 2 | No. 3 |
|---|---|---|---|
| Composition: | Mol. Per Cent | | |
| $CH_3SiO_{1.5}$ | 10 | 20 | 40 |
| $C_6H_5SiO_{1.5}$ | 20 | 12 | 20 |
| $CH_3C_6H_5SiO$ | 70 | 68 | 40 |
| Reagents: | Parts by Weight | | |
| $CH_3SiCl_3$ | 1.50 | 2.99 | 5.98 |
| $C_6H_5SiCl_3$ | 4.23 | 2.54 | 4.23 |
| $CH_3C_6H_5SiCl_2$ | 13.4 | 13.0 | 7.64 |
| Water | 33.6 | 33.9 | 38.0 |
| Toluene | 33.1 | 31.6 | 27.8 |

In each case, the chlorides were mixed and added gradually to the water and toluene with agitation. The reaction mixture was cooled during the addition, which was made at a rate sufficiently low to maintain the temperature at about 25° C. The two phases were separated by decantation, and the toluene solution was washed with water at a temperature of 30 to 35° C. until the wash water was alkaline to brom-cresol purple. The solution was then filtered. The solvent was stripped off of the solutions at reduced pressure. The temperature is allowed to rise to 95° C. during stripping. The hydrolyzate #1 was polymerized at 155° C. for 3 hours; #2 at 155–160° C. for 5.4 hours; and #3 at 135–150° C. for 9.8 hours and at 180° C. for 1.5 hours. Enough toluene was then added to each of the resins to give solutions containing about 60% solids.

Each of these enamels was employed for insulating magnet wire. Each was tested as indicated and found satisfactory for this purpose. Wires insulated with these enamels are well adapted to the manufacture of magnet coils sealed with siloxane resins, as these enamels have high softening points.

The siloxanes of the present invention have been described particularly in connection with the insulation of magnet wire. It should, however, be understood that this invention is not limited to the use of these siloxanes only for the insulation of such wire. The enamels hereof may likewise be employed in any application where the properties both of a siloxane and of a magnet wire enamel are desired.

I claim:

1. A resinous siloxane the structural units of which are as follows:

$$CH_3SiO_{1.5}$$
$$C_6H_5SiO_{1.5}$$
$$C_6H_5CH_3SiO$$

said siloxane containing 10 to 40 mol. per cent of mono methyl siloxane units, 9 to 20 mol. per cent of mono phenyl siloxane units, and 40 to 70 mol. per cent of methyl phenyl siloxane units, in which siloxane the silicon atoms are linked together by an alternating lattice of oxygen and silicon.

2. A resinous organosilicon oxide copolymer in which the silicon and oxygen atoms are present in an alternating lattice thereof, between 10 and 40 mol. per cent of the silicon atoms having as the only organo groups attached thereto by carbon-silicon linkage a single methyl radical, between 9 and 20 mol. per cent of the silicon atoms having as the only organo groups attached thereto by carbon-silicon linkage a single phenyl radical, and the balance of the silicon atoms having as the only organo groups attached thereto by carbon-silicon linkage a single methyl radical and a single phenyl radical, said balance being between 40 and 70 per cent of the silicon atoms present.

EARLE J. SMITH.

REFERENCES CITED

The following references are of record in the file of this patent:

UNITED STATES PATENTS

| Number | Name | Date |
|---|---|---|
| 2,258,222 | Rochow | Oct. 7, 1941 |
| 2,371,050 | Hyde | Mar. 6, 1945 |
| 2,383,827 | Sprung | Aug. 28, 1945 |
| 2,386,466 | Hyde | Oct. 9, 1945 |
| 2,398,672 | Sauer | Apr. 16, 1946 |
| 2,435,147 | McGregor et al. | Jan. 27, 1948 |

OTHER REFERENCES

Rochow, Chemistry of the Silicones, Wiley, 1946, pp. 93 and 94.